United States Patent [19]

Lautenschlager et al.

[11] Patent Number: 5,347,395
[45] Date of Patent: Sep. 13, 1994

[54] OPTICAL POWER LIMITING DEVICE

[75] Inventors: Peter Lautenschlager, Markdorf; Werner Scherber, Bermatingen, both of Fed. Rep. of Germany

[73] Assignee: Dornier GmbH, Friedrichshafen, Fed. Rep. of Germany

[21] Appl. No.: 924,646

[22] Filed: Aug. 6, 1992

[30] Foreign Application Priority Data

Aug. 6, 1991 [DE] Fed. Rep. of Germany ....... 4125952

[51] Int. Cl.$^5$ .............................................. F21V 9/04
[52] U.S. Cl. ................................... 359/359; 359/240
[58] Field of Search ............... 359/245, 263, 240, 298, 359/299, 359

[56] References Cited

U.S. PATENT DOCUMENTS

| | | | |
|---|---|---|---|
| 3,187,623 | 6/1965 | Zandman | 359/240 |
| 3,609,723 | 9/1971 | Alstad et al. | 359/240 |
| 3,834,793 | 9/1974 | McConnell et al. | |
| 4,022,947 | 5/1977 | Grubb et al. | 359/359 |
| 4,578,527 | 3/1986 | Rancourt et al. | 359/359 |
| 4,583,822 | 4/1986 | Southwell | 359/359 |
| 4,615,587 | 10/1986 | Knatsutsky et al. | |
| 4,733,926 | 3/1988 | Title | 359/359 |
| 4,795,240 | 1/1989 | Wong et al. | |
| 5,240,762 | 8/1993 | Miura et al. | 359/240 |

FOREIGN PATENT DOCUMENTS

| | | | |
|---|---|---|---|
| 0021336 | 1/1981 | European Pat. Off. | |
| 247972 | 12/1987 | European Pat. Off. | 359/240 |
| 3605635 | 8/1987 | Fed. Rep. of Germany | |
| 12605 | 1/1991 | Japan | 359/359 |

Primary Examiner—John T. Kwon
Attorney, Agent, or Firm—Evenson, McKeown, Edwards & Lenahan

[57] ABSTRACT

An optical power limiting device whose transmissibility within a wave length range that is of interest is a function of the intensity of the incident radiation, the detuning of the resonance of surface plasmons being utilized. The device is particularly suitable for the protection of IR-detectors against the incidence of high radiation intensities.

30 Claims, 5 Drawing Sheets

OPTICAL POWER LIMITING DEVICE

BACKGROUND AND SUMMARY OF THE INVENTION

This invention relates to an optical power limiting device for the protection of thermal imaging apparatus and the like.

$CO_2$-lasers with medium (currently common) power intensities are capable of blinding or destroying IR-detectors, such as those utilized for example, in heat image devices. Conventional filters either provide no protection against such high intensity radiation or do so only with a considerable loss of sensitivity, because the operating frequencies of the $CO_2$-laser are within the maximum of the ambient radiation.

One countermeasure may be the use of very narrow-band selective filters which effectively exclude the laser radiation without impairing the sensitivity of the heat image device. This method is practical as long as the threat is limited to a few discrete frequencies, but would fail in the case of variable lasers, whose frequency can be changed within certain limits.

A widely used solution to this problem consists of a filter or a screen with an externally controlled intensity-dependent transmissibility, thus providing an optical power limiting device. However, arrangements which use an external control mechanism are unsuitable, at least as a primary protection, because of the long idle times.

German Patent Document DE 36 05 635 A1 discloses a power limiting device for laser light without an outside control mechanism, in which the transmissibility decreases considerably with rising intensity of the radiation to be limited. It comprises a breakthrough path consisting of a gaseous, liquid or solid material. Power limitation is based on the physical principle that, with rising intensity of the incident radiation, a plasma is created by means of multi-phonon absorption and cascade ionization which protects from the laser radiation. A disadvantage of this arrangement, however, is that the equipment expenditures are relatively high. Thus, corresponding receptacles are required for the breakthrough path, for example, in the case of liquid or gaseous materials. Since the breakthrough threshold value depends on the pressure inside the materials, a constant controlling of pressure is also required, and unintentional pressure loss may result in malfunctioning.

European Patent Document EP 21 336 A1 describes an optical image apparatus comprising a prism, with incident radiation being guided into the prism and onto its base. On the base, there is a layer whose dielectric constant is negative in the relevant wave length range. (The dielectric constant is a measure of the extent to which a material transmits an incident light beam, as well as to extent to which it absorbs incident light.) A medium with a variable refraction index is arranged in contact with this first layer. The refraction index of the medium, and thus the degree of reflection on the base on the prism, can be changed by various control mechanisms, such as for example, an electrochemical, a photochromic or an electrochromic process.

In *Applied Optics*, Vol. 13, No. 1, Jan. 74, Pages 17 to 19, a beam reducer is described, in which a layer is arranged between two prisms. The refraction index of the layer is smaller than that of the prism material. By changing the layer thickness, the transmission ratio of the arrangement can be changed.

U.S. Pat. No. 3,834,793 describes a dichromatic mirror made of a substrate having a reflectivity that is as high as possible, to which several layers are applied. At least one of such layers is $VO_2$. Incident white light passes through the individual layers and is partially reflected on the boundary surfaces, and completely reflected on the substrate. Due to interference of the light reflected on the different boundary surfaces, certain wavelengths are amplified, and others are extinguished. By the heating of the $VO_2$-layer and the resulting change of the refraction index, the color of the reflected light can be changed.

U.S. Pat. No. 4,795,240, discloses an infrared shutter which has a thin layer of a thermochromic material, the transmissibility of which decreases considerably as the temperature rises. The transmissibility of the layer can be controlled by an outside control mechanism. For this purpose, an electric current of a defined intensity is conducted through a layer which is adjacent to the thermochromic layer. The resulting resistance heat is used to control the temperature of the thermochromic layer.

U.S. Pat. No. 4,615,587 discloses a thermooptic thin-film modulator by means of which image information can be impressed into a thin thermooptic layer whose transmissibility falls considerably as the temperature rises, and can be deleted again. For this purpose, rapid temperature control of the thermooptic layer is required, which is achieved by conducting an electric current through a metal layer adjacent to the thermooptic layer for the purpose of resistance heating, and at the same time, using a cooling liquid to dissipate a portion of the generated heat. By interruption of the current, the equilibrium of the heat production and heat loss can be altered and, as a result, the temperature of the thermooptic layer can be changed very rapidly.

It is an object of the present invention to provide an optical power limiting device for a radiation which permits secure operation with low equipment-related expenditures.

This object is achieved by the power limiting device according to the invention, which has a transmissibility that is a function of the intensity of the incident radiation within a wave length range of from 1 to 20 $\mu$m. It comprises a prism with at least one plane boundary surface to which two layers, arranged above one another, are applied. One layer (active layer) consists of a material whose real component of the dielectric function is negative in the relevant frequency range; the other (a dispersion layer) consists of a material whose refraction index is closely dependent on the temperature in the frequency interval of interest. The radiation to be limited is guided into the prism and onto the plane boundary surface comprising the above mentioned layers. A prism, in this case, is generally a body made of a light-transmitting and refracting material which is bounded by at least two intersecting planes. The refraction index of the prism material must be greater than that of the surrounding medium, which is generally air.

The invention is based on utilization of the resonance characteristics of surface plasmons which propagate on the active layer. Changing the plasmon resonance characteristics causes a change in reflectivity during reflection of incident radiation on the plane boundary surface of the prism. This change of the reflectivity is utilized to limit the power that is transmitted.

The resonance characteristics of the surface plasmons are significantly influenced by the optical characteristics of the adjacent dispersion layer, particularly by its refraction index. Thus, by changing the refraction index of the dispersion layer, a change of the reflectivity can be achieved. In the case of the present invention, this change of the refraction index is caused by heating. That is, the dispersion layer consists of a material whose refraction index is highly dependent on its temperature (thermorefractive material).

It is crucial that the required heating in this case is controlled directly by the radiation to be limited, and not by an outside control mechanism. That is, the incidence of high intensity radiation heats the arrangement due to residual absorption of the participating materials.

In the case of low light intensities, the light which is incident in the prism is reflected almost completely. In the case of high intensities, the absorption starts by means of the generating of surface plasmons, and the reflected light intensity is reduced very considerably.

The dispersion layer is microscopically thin—in the nm/μm-range—so that its heating and the desired change of the reflectivity can take place very rapidly.

Other objects, advantages and novel features of the present invention will become apparent from the following detailed description of the invention when considered in conjunction with the accompanying drawings.

DETAILED DESCRIPTION OF THE DRAWINGS

Surface plasmons (SPP, or surface plasmon pariton) are a special form of an electromagnetic vibration which can occur on the boundary surface between a dielectric and a metal. Since incident radiation on surfaces cannot couple directly into the SPP-mode, special arrangement are required, such as the arrangement outlined schematically in FIG. 1a according to the method of the "Attenuated Total Reflection" (ATR).

Figure 1A:
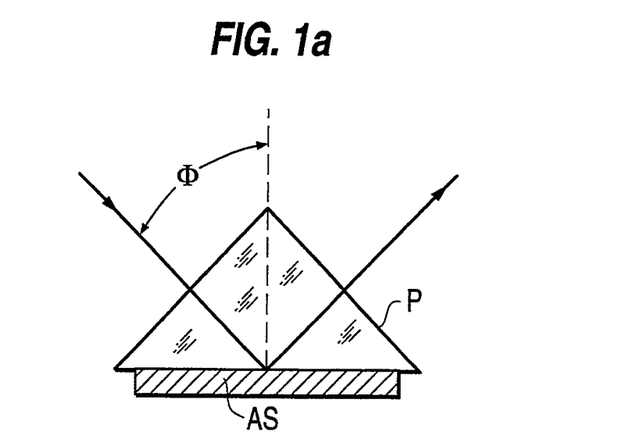
FIG. 1a is a view of an optical deflecting unit by means of which surface plasmons are generated according to the method of Attenuated Total Reflection (ATR)

FIG. 1a illustrates a prism P, to the base of which a thin metal layer AS is applied (having a thickness in the μm range). The thickness of the metal layer as shown in the drawing is exaggerated in comparison to the height of the prism P. An incident light beam is shown as deflected on the base of the prism P, the angle $\Phi$ indicating the angle of incidence of the light beam.

Figure 1B:
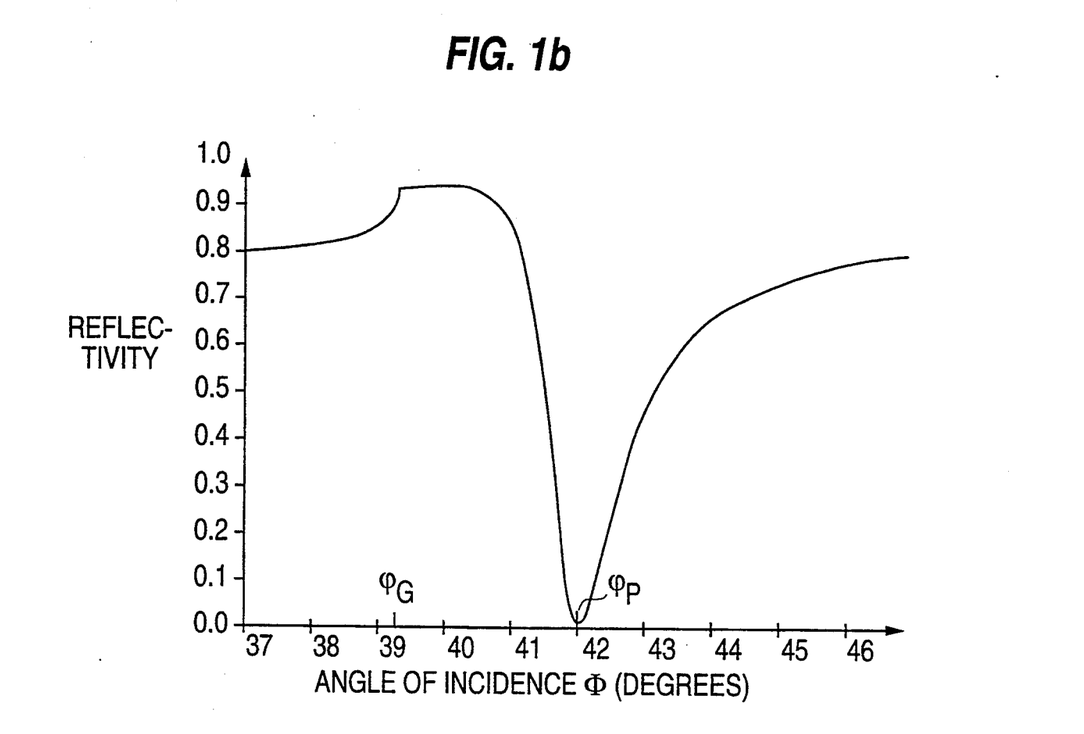
FIG. 1b is a graphic representation of the reflectivity of the deflecting unit of FIG. 1a as a function of the angle of incidence (ATR-spectrum)

The calculated reflectivity, shown in FIG. 1b as a function of the angle of incidence $\Phi$, may take on values of between 0 and 1 (where a value of 1 means that all incident radiation is reflected). In the case of small angles, the degree of reflection rises to the point of the total reflection $\Phi_g$ at which the incident light is almost completely reflected. At a slightly higher value of $\Phi$ ($\Phi_p > \Phi_g$), by stimulation of the SPP-mode (generating surface plasmons), there is an almost complete absorption. The steep rise is noteworthy from full reflection to the total absorption along a narrow angle range.

A prerequisite for stimulating the SPP-mode is that the light is p-polarized, and the electric field vector therefore oscillates in parallel to the plane of incidence. SPP-vibration is localized on the outside boundary surface of the metal layer which is active for the surface plasmons. A principle of the invention is the proposition that, by means of another layer (the dispersion layer) which connects to this boundary surface, resonance action, particularly for the angle $\Phi_p$, can be influenced profoundly because the existence and the propagation action of the SPP oscillation depends significantly on the optical constants, for example, the dielectric constants $\epsilon$, of this layer.

Figure 2A:
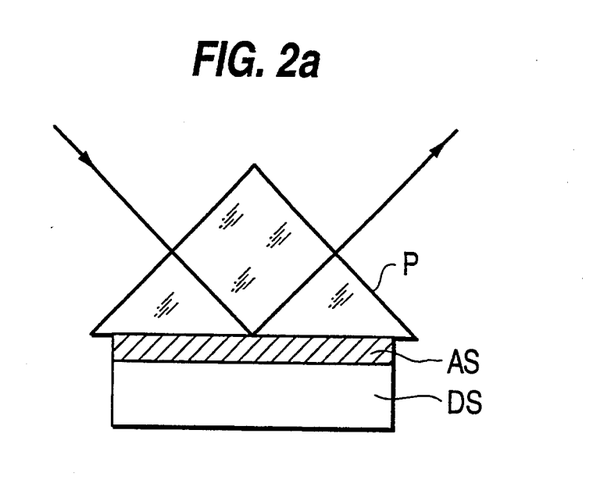
FIGS. 2a and 2b are views of two embodiments of the arrangement according to the invention.
Figure 2B:
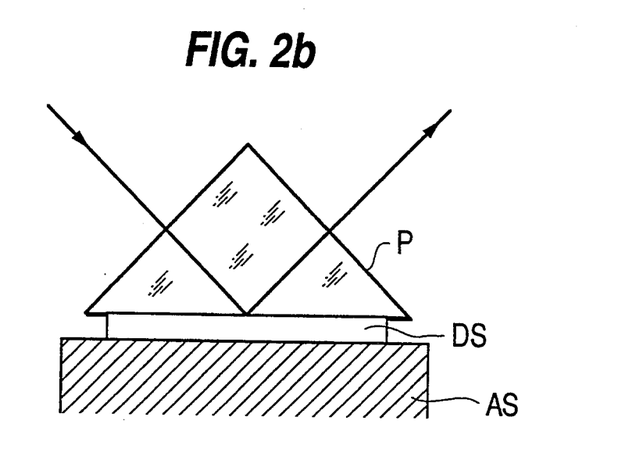

FIG. 2 is a view of two possible embodiments of the arrangement according to the invention. In FIG. 2a, the active layer AS is applied directly to the coupling-in prism P, with the dispersion layer DS being applied to the active layer. Both layers AS, DS are microscopically thin. Their layer thicknesses are in the range of nm/μm. Preferably, the thickness of the active layer AS is in the range of from 500 to 1,500 nm; the thickness of the dispersion layer DS is in the range of from 50 to 2,000 nm.

In FIG. 2b, the dispersion layer DS is applied directly to the coupling-in prism, while the active layer is applied to the dispersion layer, which is microscopically thin (in the range of nm/μm). The thickness of the active layer AS, in contrast, may be arbitrarily, particularly macroscopically thick (in the range of cm). Preferably, the thickness of the dispersion layer DS is between 1,000 and 2,000 nm.

The thickness of the microscopically thin layers is not drawn according to scale with respect to the dimensions of the prism P. In both cases, the active layer AS consists of a material whose real component of the dielectric function is negative in the relevant wave length range that is considered, while the dispersion layer DS consists of a thermorefractive material whose refraction index is very dependent on the temperature.

Since the method of operation of the arrangement according to the invention is based on the heating of the dispersion layer DS made of thermorefractive material by means of the incident radiation, the embodiment in FIG. 2a is particularly suitable because, as a result of the thin layers, it has a low heat capacity and therefor very short response times. In the event of very high power density of the incident light beam, however, the arrangement is heated considerably which can lead to irreversible changes. For this reason, materials which are particularly temperature-resistant must be used. However, an irreversibly operating power limiting device which can be used only once may also be used in a meaningful manner.

The absorption properties of the prism P may also be included as a secondary (transposed with respect to time) protective function. For this purpose, prism materials are used whose absorption capacity is considerably increased by heating. The response time of this additional protective function is higher because, in contrast to the heating of the microscopically thin dispersion layer DS, the massive prism body must be heated.

Because of the massive active layer, the construction in FIG. 2b offers favorable conditions for effectively carrying away high radiation powers by means of active cooling.

The materials for the active layer and for the dispersion layer must be selected as a function of the wave length range in which the deflecting device according to the invention is to be used. The wave length range that is of interest here is the range between 1 and 20 $\mu$m. This range includes, for example, the atmospheric windows (approximately 3-5 $\mu$m and approximately 8-12 $\mu$m) as well as the wavelength of the $CO_2$-laser (10.6 $\mu$m). Power limiting devices which are designed for this wave length range may be used mainly for the protection of IR-detectors, for example, in heat image devices against the incidence of high radiation intensities.

The active layer is made of materials whose real component of the dielectric function, Re $\epsilon$, is negative in the relevant wave length range; that is, between 1 and 20 $\mu$m. Basically all metals meet this requirement because of their high concentration of free charge carriers. However, the calculation of the ATR spectrum (compare FIG. 1) shows that, because of the large values of the absolute amount $|Re\ \epsilon|$ for these metals, the angle area in which the surface plasmon is stimulated is smaller than one tenth of a degree. Therefore, those materials are advantageously used whose real component of the dielectric function is negative in the wave range that is of interest but, in addition, are larger than $-100$, and particularly advantageously, larger than $-10$.

This may be achieved by reducing the number of the free charge carriers, for example, by embedding metal particles in a dielectric, using so-called cermet materials or highly doped semiconductor materials, in the case of which the plasma frequency of the free charge carriers is close to the $CO_2$-laser wavelength.

Figure 3:
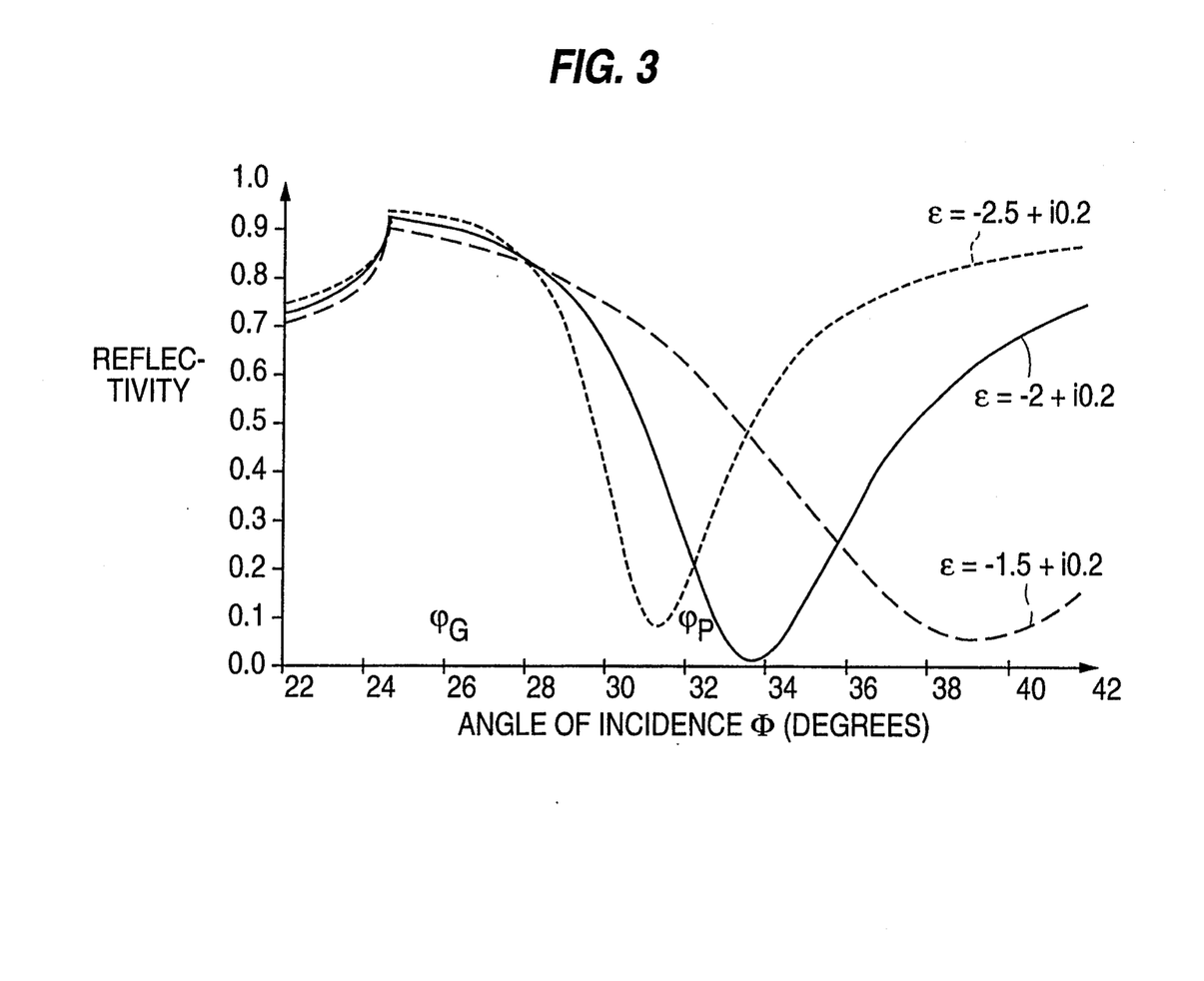
FIG. 3 is a view of the ATR-spectrum of an optical deflecting unit according to FIG. 1 for three different materials of the active layer.

In the infrared spectral region, some dielectrics exhibit a range ("Reststrahlen band") in which Re $\epsilon < -1$; $|Re\ \epsilon|$, however, is much smaller than in the case of metals. Examples of such materials, which may be used for the relevant wave length range of 1-20 $\mu$m, are quartz, $Al_2O_3$, BeO or AlN. FIG. 3 shows the calculated angle-dependent course of the ATR for a ZnSe-prism ($\epsilon = 5.78$) and an active layer of a thickness of 1.2 $\mu$m, for which different typical values of the dielectric function are assumed in the case of a wavelength of 10.6 $\mu$m. In this case, the angular width of the plasmon resonance (the angle range in which the reflection decreases significantly) is larger than four degrees.

The dispersion layer requires the use of thermorefractive materials for which the refraction index is highly temperature dependent in the relevant wave length range; in this case, between 1 and 20 $\mu$m. For this purpose, materials may be used which have a high temperature response of the refraction index. However, particularly suitable are materials which, because of a phase transition, in the case of an appropriate temperature, have an abrupt change in the refraction index, such as liquid crystals, vanadium oxide $VO_2$. By selection of a material with a corresponding transition temperature, the usage threshold of the power limiting device can be adapted to the tolerance limit of an IR-detector to be protected.

The operation of the arrangement according to the invention will now be explained in detail, by reference to FIG. 2a. The prism P is made of KBr with a dielectric constant $\epsilon$ of 2.33, with the active layer being made of a material in whose Reststrahlen band $\epsilon = -4 + i\ 0.2$. ($\epsilon$ the dielectric constant, is in this case a complex number including imaginary component i.) The recited values are for a wavelength $\gamma = 10.6$ $\mu$m. As the dispersion layer, $VO_2$ is used which at approximately 67° C. shows a semiconductor-metal phase transition which, for example, at $\gamma = 3.4$ $\mu$m, causes a change of the dielectric constant from $\epsilon = 7.62 + i\ 0.11$ (semiconductor) to $\gamma = -13.6 + i\ 21.1$ (metal). The thickness of the active layer is 0.6 $\mu$m; and the thickness of the dispersion layer is 60 nm.

Figure 4:
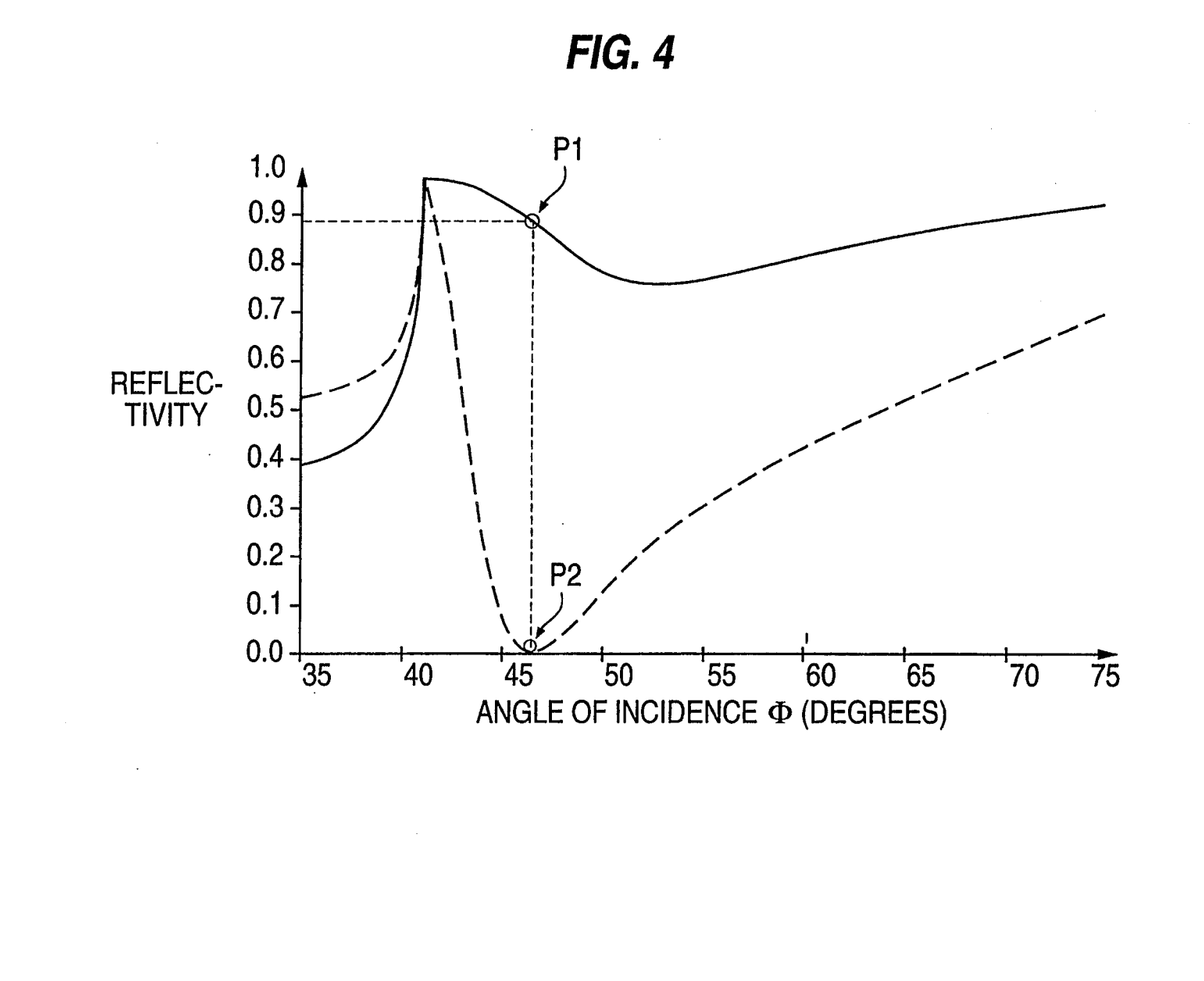
FIG. 4 is a graphic representation of the reflectivity as a function of the angle of incidence of an arrangement according to the invention.

FIG. 4 illustrates the reflectivity of the deflection unit as a function of the angle of incidence $\Phi$ of the incident radiation from the respective wave length range. The solid line represents the reflectivity for low light intensities, in which the surface layers of the arrangement are not heated at all, or are heated only slightly by the incident radiation. The $VO_2$ is therefore in a semiconducting state. The plasmon resonance is only slightly pronounced; the maximal absorption (minimal reflection) is at an angle of incidence $\Phi$ of approximately 52 degrees.

The interrupted line shows the reflectivity of the deflection unit for strong light intensity, which heats the surface layers considerably, resulting in a phase transition of the $VO_2$ into the metallic state and a corresponding change of the dielectric constant $\epsilon$. The plasmon resonance is very pronounced, and, at an angle of incidence $\Phi$ of 46°, the reflectivity is approximately zero; that is, all beamed-in energy is absorbed by the generating of surface plasmons.

When a fixed angle of incidence $\Phi$ of 46° is chosen, the reflectivity for weak incident light intensity (Point P1) amounts to approximately 88%. In contrast, in the case of high light intensities, an approximately imperceptible reflectivity (Point P2) is obtained.

Figure 5:
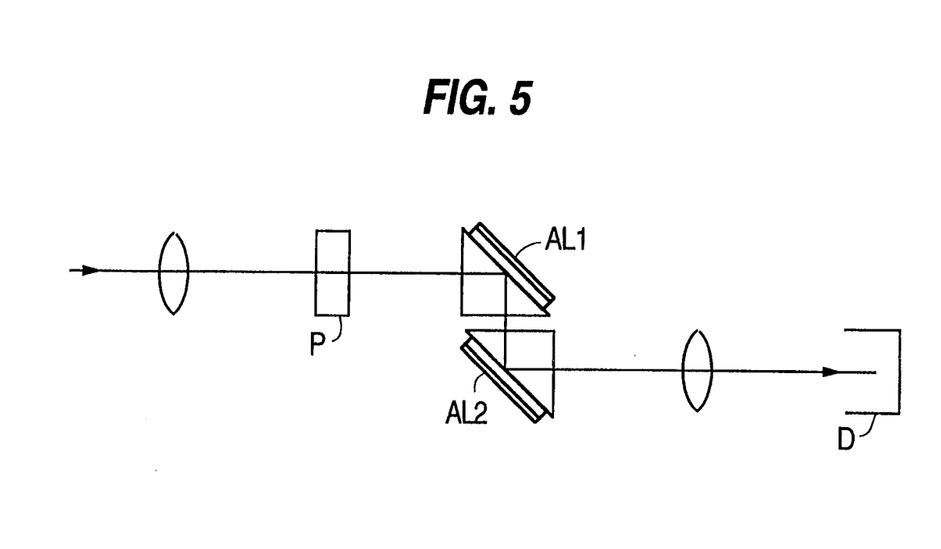
FIG. 5 is a view of the use of two arrangements of the invention according to FIG. 4 for the protection of a heat image device against the incidence of high radiation intensities.

FIG. 5 illustrates a beam path in which two optical power limiting devices AL1, AL2 of the type described by means of FIG. 4 are used for protecting an IR-detector against the incidence of high radiation intensities.

The incident radiation passes through a polarizer P, is deflected on the two identical power limiting devices AL1, AL2, and then reaches the IR-detector D. The polarizer P transmits only radiation whose electric field vector oscillates parallel to the plane of incidence with respect to the reflection on the two following power limiting devices AL1, AL2. The deflecting units AL1, AL2 are arranged with respect to the incident light beam such that the angle of incidence $\Phi$ for each of the two deflecting units AL1, AL2 is 46° respectively. As explained in the description with respect to FIG. 4, for this angle $\Phi$, the absorption is the strongest in the case of intensive radiation, such as $CO_2$-laser radiation, whereas less intensive radiation is almost completely reflected, and thus reaches the IR-detector.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An optical power limiting device whose transmissibility within a predetermined wave length range is a function of intensity of incident radiation, comprising:
   a prism having at least one plane boundary surface;
   two layers, which are applied to the plane boundary surface, one above the other, a first of said two layers being an active layer comprising a material having a dielectric function with a real component that is negative in the predetermined wave length range, and the second of said two layers being a dispersion layer comprising a material having a refraction index in the predetermined wave length range that is strongly dependent on temperature; and
   means for guiding incident radiation into the prism and onto the plane boundary surface, whereby the dispersion layer is heated in response to increasing intensity of said incident radiation.

2. An optical power limiting device according to claim 1, wherein said predetermined wave length range is from 1 to 20 μm.

3. An optical power limiting device according to claim 1, wherein the active layer (AS) is applied to the plane boundary surface, and the dispersion layer (DS) is applied to the active layer (AS).

4. An optical power limiting device according to claim 3, wherein the layer thickness of the active layer (AS) is in the range of from 500 nm to 1,500 nm, and the layer thickness of the dispersion layer (DS) is in the range of from 50 to 2,000 nm.

5. An optical power limiting device according to claim 1, wherein the dispersion layer (DS) is applied to the plane boundary surface, and the active layer (AS) is applied to the dispersion layer (DS).

6. An optical power limiting device according to claim 5, wherein the thickness of the dispersion layer (DS) is in the range of from 1,000 to 2,000 nm.

7. An optical power limiting device according to claim 1, wherein the active layer (AS) is made from a cermet material.

8. An optical power limiting device according to claim 2, wherein the active layer (AS) is made from a cermet material.

9. An optical power limiting device according to claim 7, wherein said cermet material is one of :Cu in KBr and Cu in Ge.

10. An optical power limiting device according to claim 8, wherein said cermet material is one of :Cu in KBr and Cu in Ge.

11. An optical power limiting device according to claim 1, wherein the active layer is made from a highly doped semiconductor.

12. An optical power limiting device according to claim 2, wherein the active layer is made from a highly doped semiconductor.

13. An optical power limiting device according to claim 11, wherein said semiconductor is one of Si, Ge, $In_2O_3:SnO_2$.

14. An optical power limiting device according to claim 1, wherein the material for the dispersion layer (DS) is one of: a liquid crystal and a substance with a semiconductor-metal transition.

15. An optical power limiting device according to claim 2, wherein the material for the dispersion layer (DS) is one of: a liquid crystal and a substance with a semiconductor-metal transition.

16. An optical power limiting device according to claim 14, wherein said substance with a semiconductor-metal transition is $VO_2$.

17. An optical power limiting device according to claim 1, wherein the material for the prism (P) is KBr; the material for the active layer (AS) is $Al_2O_3$, having a thickness of 0.6 μm; and the material for the dispersion layer (DS) is $VO_2$, having a thickness of 60 nm.

18. An optical power limiting device according to claim 2, wherein the material for the prism (P) is KBr; the material for the active layer (AS) is $Al_2O_3$, having a thickness of 0.6 μm; and the material for the dispersion layer (DS) is $VO_2$, having a thickness of 60 nm.

19. An optical power limiting device according to claim 1, wherein the prism (P) is made of a material whose absorption capacity increases substantially as the temperature rises.

20. An optical power limiting device according to claim 3, wherein the prism (P) is made of a material whose absorption capacity increases substantially as the temperature rises.

21. An optical power limiting device according to claim 5, wherein the prism (P) is made of a material whose absorption capacity increases substantially as the temperature rises.

22. An optical power limiting device according to claim 7, wherein the prism (P) is made of a material whose absorption capacity increases substantially as the temperature rises.

23. An optical power limiting device according to claim 11, wherein the prism (P) is made of a material whose absorption capacity increases substantially as the temperature rises.

24. An optical power limiting device according to claim 14, wherein the prism (P) is made of a material whose absorption capacity increases substantially as the temperature rises.

25. Method of protecting an IR detector from high intensity radiation, comprising the steps of:
   providing a prism having at least one plane boundary surface with two layers applied thereto, a first of said layers being an active layer made of a material having a dielectric function with a real component that is negative in a predetermined wave length range, and the second of said layers being a dispersion layer made of a material having a refraction index in the predetermined wave length range that is strongly dependent on temperature; and
   heating said dispersion layer in response to increasing intensity of said radiation.

26. Method according to claim 25 wherein said heating step comprises interposing said prism in an optical input path of said IR detector, whereby said radiation is conducted into and reflected by the plane boundary surface.

27. An optical power limiting device whose transmissibility within a predetermined wave length range is a function of intensity of incident radiation, comprising:
   a prism having at least one plane boundary surface;
   two layers applied to the plane boundary surface, one above the other, a first of said two layers being an active layer comprising a material having a dielectric function with a real component that is negative in the predetermined wave length range, and the second of said two layers being a dispersion layer comprising a material having a refraction index in the predetermined wave length range that is strongly dependent on temperature; and means for heating said dispersion layer in response to the increasing intensity of said incident radiation.

28. Optical power limiting device according to claim 27 wherein said means for heating comprises:

means for guiding incident radiation into the prism and onto the plane boundary surface.

29. An optical power limiting device comprising:
a prism having at least one plane boundary surface;
said first and second layers applied to the plane boundary surface, one above the other;
first layer comprising a material having a dielectric function with a real component that is negative in the predetermined wave length range;
said second layer having a variable refraction index; and means for varying said refraction index of said second layer in response to intensity of radiation transmitted to said prism.

30. Optical power limiting device according to claim 29 wherein said second layer is comprised of a material having a refraction index in a predetermined wave length range that is strongly dependent on temperature; and wherein said means for varying said refraction index comprises means for directing said incident radiation into the prism and onto the plane boundary surface, whereby said second layer is heated in response to increasing intensity of said incident radiation.

* * * * *